US009200709B2

(12) United States Patent
Eidem et al.

(10) Patent No.: US 9,200,709 B2
(45) Date of Patent: Dec. 1, 2015

(54) SURFACE POSITIONING FOR COMPRESSIBLE SEAL ARRANGEMENT

(71) Applicant: International Business Machines Corporation, Armonk, NY (US)

(72) Inventors: Jessica R. Eidem, Rochester, MN (US); James D. Gerken, Zumbro Falls, MN (US); David B. Johnson, Seattle, WA (US)

(73) Assignee: International Business Machines Corporation, Armonk, NY (US)

( * ) Notice: Subject to any disclaimer, the term of this patent is extended or adjusted under 35 U.S.C. 154(b) by 188 days.

(21) Appl. No.: 13/906,499

(22) Filed: May 31, 2013

(65) Prior Publication Data
US 2014/0353919 A1 Dec. 4, 2014

(51) Int. Cl.
F16J 15/06 (2006.01)
F16J 15/10 (2006.01)
F16J 15/32 (2006.01)
G06F 1/18 (2006.01)

(52) U.S. Cl.
CPC .............. *F16J 15/062* (2013.01); *F16J 15/106* (2013.01); *F16J 15/3268* (2013.01); *G06F 1/181* (2013.01)

(58) Field of Classification Search
CPC ..... F16J 15/3252; F16J 15/3248; F16J 15/32; F16J 15/16; F16J 15/062; F16J 15/106; F16J 15/3268; B65D 45/22; B65D 45/16; G06F 1/182; G06F 1/181
USPC ................. 220/326, 324, 315, 812, 811, 810; 277/345; 361/679.02, 727, 726, 725, 361/724
See application file for complete search history.

(56) References Cited

U.S. PATENT DOCUMENTS

| 5,127,660 | A | 7/1992 | Maier |
| 5,762,224 | A | 6/1998 | Benn et al. |
| 6,826,057 | B1* | 11/2004 | Gundogan et al. ............ 361/726 |
| 7,012,805 | B2* | 3/2006 | Shah et al. ............... 361/679.36 |
| 7,086,653 | B2 | 8/2006 | Gillard et al. |
| 7,763,810 | B2 | 7/2010 | van Haaster |
| 2008/0231001 | A1 | 9/2008 | Hawkins |
| 2012/0228836 | A1 | 9/2012 | Holmes, IV et al. |
| 2013/0043656 | A1 | 2/2013 | Copeland et al. |
| 2014/0085720 | A1* | 3/2014 | Merz ............................ 359/480 |

OTHER PUBLICATIONS

Anonymous, "Ultra-Thin Profile Gasket Solution", IP.com Prior Art Database Technical Disclosure. IP.com No. IPCOM000208109D, published Jun. 23, 2011.
Sandu, M., et al, "Possibilities to Reduce the Stress Concentration in Adhesively Bonded Joints", Transactions of Famena XXXIV-3, 2010. ISSN 1333-1124, pp. 21-28, published in Romania.

* cited by examiner

*Primary Examiner* — Robert J Hicks
(74) *Attorney, Agent, or Firm* — Penny L. Lowry; Robert Williams

(57) ABSTRACT

A mechanical assembly including a pair of members each having a planar surface and a displacing structure can be designed to engage a compressible seal, and thereby reduce or eliminate shear force exerted on the seal, keeping the seal intact during compression. Each displacing structure can have a displacing surface and a latching surface. A compressible seal can be affixed to one of the planar surfaces. Contact between the displacing surfaces during parallel movement of the planar surfaces relative to each other may create a separation between the planar surfaces greater than the compressible seal height. Positioning of the displacing surfaces past each other during parallel movement of the planar surfaces relative to each other may initiate the compression of the compressible seal between the planar surfaces.

9 Claims, 7 Drawing Sheets

SURFACE POSITIONING FOR COMPRESSIBLE SEAL ARRANGEMENT

TECHNICAL FIELD

The present disclosure relates to compressible seals. In particular, this disclosure relates to an apparatus to ensure the reliability of compressible seals between two planar surfaces.

BACKGROUND

Compressible seals (gaskets) may be used to form a seal between two members of a mechanical assembly, for example between a chassis and a removable cover. The compressible seal may be used to contain or attenuate electromagnetic interference (EMI), or contain or direct cooling airflow within the chassis.

As operating frequencies of electronic equipment have increased, the need to seal off smaller openings and gaps to contain high-frequency EMI has also increased. Similarly, the containment and routing of cooling airflow within the chassis is increasingly critical to the proper cooling and reliability of heat-producing electronic and other types of systems.

Compressible seals can be vulnerable to sheer forces exerted on them by equipment members that may be out of alignment or that have inappropriate dimensional tolerances, and may become detached, deformed, or sheered due to excess sheer force. Failure of the compressible seal may result in equipment malfunctions, including excess EMI emissions and overheating.

SUMMARY

Embodiments are directed to an apparatus which may include a first member having a first planar surface, the first member also having a first displacing structure. The first displacing structure may have a displacing surface and a latching surface. The apparatus may also include a second member having a second planar surface, the second member also having a second displacing structure. The second displacing structure may have a displacing surface and a latching surface. The apparatus may also have a compressible seal affixed to the second planar surface. The first and second displacing structures may be adapted so that contact between the first and second displacing surfaces during parallel movement of the first planar surface relative to the second planar surface creates a separation between the first and second planar surfaces greater than a height of the compressible seal. The first and second displacing structures may be further adapted so that the positioning of the first and second displacing surfaces past each other during parallel movement of the first planar surface relative to the second planar surface initiates the compression of the compressible seal between the first and second planar surfaces.

Aspects of the various embodiments are directed towards engaging a compressible seal so that shear force on the compressible seal is reduced or eliminated, and the compressible seal remains intact during compression. Keeping the seal intact during compression may provide a more reliable seal between two planar surfaces.

BRIEF DESCRIPTION OF THE DRAWINGS

The drawings included in the present application are incorporated into, and form part of, the specification. They illustrate embodiments of the present invention and, along with the description, serve to explain the principles of the invention. The drawings are only illustrative of embodiments and do not limit the invention.

In the drawings and the Detailed Description, like numbers generally refer to like components, parts, steps, and processes.

DETAILED DESCRIPTION

Figure 1:
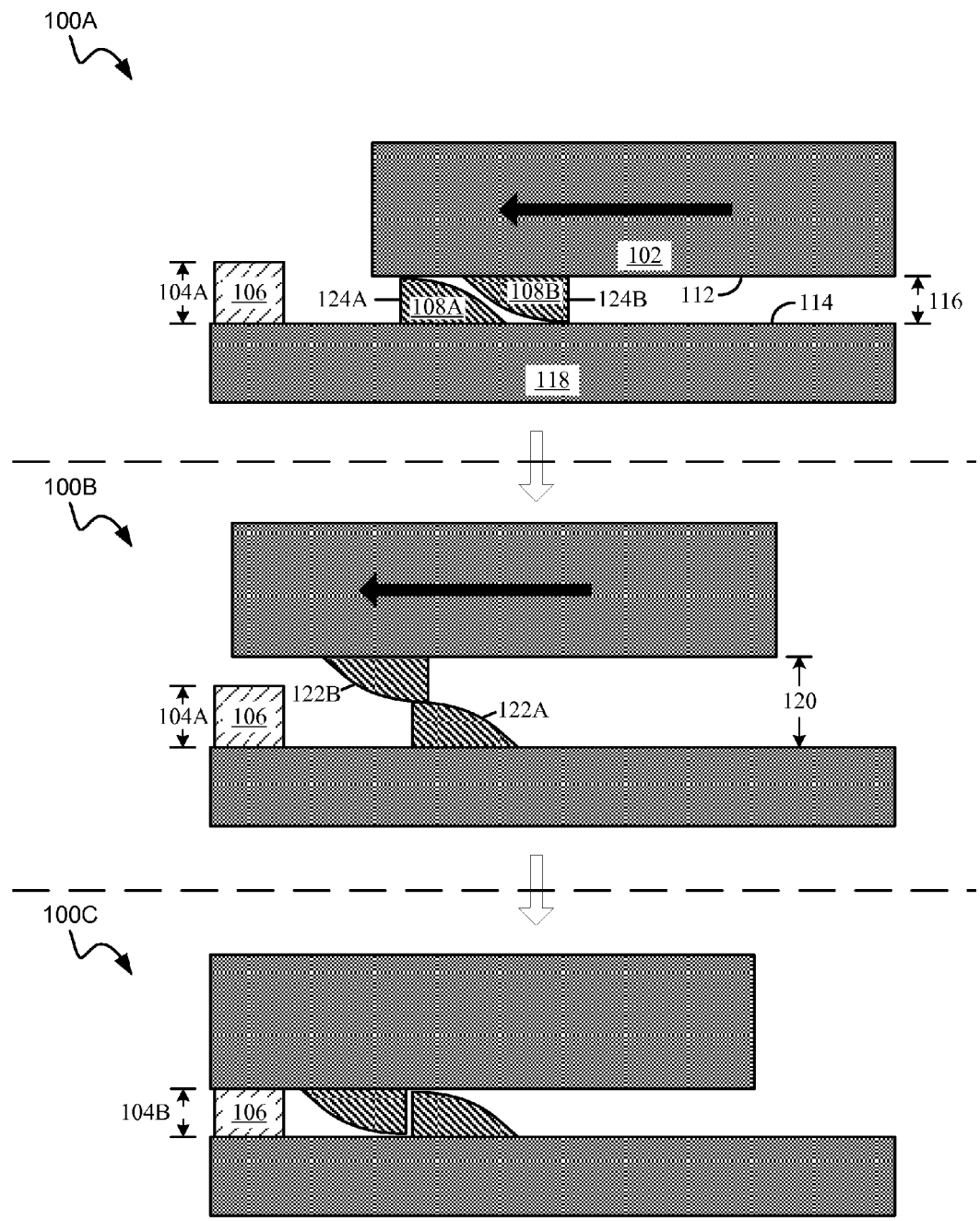
FIG. 1 includes side views of members in three different orientations with displacing structures having a curved displacing surface, according to embodiments of the present disclosure.

In general, various embodiments of the present disclosure relate to displacing structures that are designed to engage a compressible seal and thereby reduce or eliminate shear force exerted on the seal, keeping the seal intact during compression. According to certain embodiments, a mechanical assembly of compressible seals between two parallel planar surfaces may help to ensure the reliability of compressible seals by avoiding detachment, deformation, or sheer of the compressible seal. The two surfaces may be those of mechanical components including but not limited to equipment drawers, panels, covers or a chassis. A mechanical assembly according to embodiments of the present disclosure may also be configured to secure two members to one another by engaging two latching surfaces that are located on complimentary displacing structures.

Certain embodiments of the present disclosure can be appreciated in the context of computer and other electronic equipment housed in a chassis with one or removable covers, drawers, or access panels. Such equipment may include compressible seals designed to attenuate EMI, contain or direct airflow. While not necessarily limited thereto, embodiments discussed in this context can facilitate an understanding of various aspects of the disclosure. Certain embodiments can also be directed towards other equipment and associated applications, such as equipment involving containment or routing of fluids, vacuum seals, and containment of pressurized gasses or liquids.

For purposes of discussion, the compressible seal (gasket) includes interface materials and/or structures that prevent leakage (form a seal) when compressed between two parallel planar surfaces of mechanical assembly members. The compressible seal can be useful for a variety of purposes including, but not limited to, attenuating electromagnetic interference (EMI), directing airflow, containing a fluid within a space and/or directing the flow of a fluid.

Also for purposes of discussion, sheer forces may be exerted against a side of the compressible seal. The sheer force may result from a member (component) or part of a chassis that is out of alignment, possibly due to a design or manufacturing error, or tolerance issue.

Multiple compressible seals may also be used together, e.g., to create channels between the two parallel surfaces. Such channels can be used to direct a flow of air, a fluid, or route or contain cables, hoses, other devices.

Initial production runs of a mechanical design that includes compressible seals (e.g., fabric-over-foam or metal fingerstock types) between two planar surfaces may yield assemblies with incorrectly specified or fabricated tolerances between the two surfaces. The incorrect tolerances may result in excessive sheer forces on the compressible seal, and sheering, displacement, or deformation of the compressible seal may result. For example, excessive sheering force may result from a flaw in the structural design where an embossment (trough) was too shallow to securely seat the compressible seal, or where there was no embossment at all.

An embossment of a surface can create a recess in which a lower portion of the compressible seal resides. In some instances, this may provide support to a side of the compressible seal, which may counteract the sheering forces experienced during insertion or removal of a mechanical member (component).

Sheer forces may be detrimental to the placement of and subsequent seal formed by the compressible seal or gasket. An applied sheer force may shear (cut or sever) the compressible seal, detach it from a surface, or roll (deform) it away from its attached location. Compressible seal detachment may include release of adhesive, connectors, or other attachment method. Any profile, shape or type of compressible seal may experience one or more forms of sheering, detachment or deformation, depending on the location and magnitude of the sheer forces involved.

When the compressible seal is sheered off, deformed, or displaced from its intended position, the seal that it was designed to provide may be compromised, resulting in EMI, air, or fluid leakage, which in turn may cause reduced performance or failure of a design. Failure may include EMI emissions levels which exceed standards mandated by government or other agencies. Failure may also include unintended leakage of cooling air, resulting in overheating of air-cooled components.

Embodiments are suitable to a variety of different types of compressible seals. Compressible seal types may include, but are not limited to, fabric-over-foam, plain foam, fingerstock, weather-stripping and Velcro. Other compressible seal types are contemplated. Compressible seals may be permanent or temporary, removable or non-removable, and may include forms of caulk, silicon, RTV or other sealants.

For simplicity of illustration, a compressible seal 106 having a rectangular profile is shown in the figures, however, a variety of shapes or sizes of compressible seals may be used, including, but not limited to, square, round or oval shapes. Compressible seal 106 is depicted in the figures as one piece, for simplicity, but it will be understood that, for example, compressible seal 106 may have a first portion and a second portion respectively affixed to planar surfaces 112, 114 that together have an uncompressed height of 104A and a compressed height of 104B.

Without limitation, the compressible seal can be attached to a surface using one or more of adhesives or strips of adhesive, rivets, clips, Velcro, embedded magnetic material, epoxy, welds, various insertable fasteners (screws, darts, and rivets), zip ties or snaps. Consistent with certain embodiments, the compressible seal is designed to be physically secured, so as not interfere with either the compressible seal, or the adjacent planar mating surfaces.

Various embodiments are described in the context of displacing structures that are attached to (or integral to) facing planar surfaces of two mechanical members or components. A compressible seal is attached to one of the planar surfaces and is configured to facilitate the formation of a seal between the two planar surfaces.

Each displacing structure has both a displacing surface and a latching surface. The displacing surface is designed to create or maintain a displacement between the two member's planar surfaces greater than the uncompressed height of the compressible seal. The created displacement allows one surface to move parallel to the other, positioning the seal between the two planar surfaces while exerting minimal or no sheer force on the compressible seal.

The latching surfaces may be used to create a latching or retention effect between the two members after compression of the compressible seal. The latching surface may also be used to reduce displacement between the member's planar surfaces once the parallel surfaces are positioned above and below the compressible seal. Sloped latching surfaces may provide a gradual reduction of displacement as a result of parallel motion between the two members. Vertical latching surfaces may provide an abrupt reduction of displacement as a result of parallel motion between the two members by allowing the members to come together in a substantially vertical direction (as opposed to gradual displacement reduction caused by sloped latching surfaces). This reduced displacement may cause compression of the compressible seal, while reducing or eliminating sheer force on the compressible seal.

Consistent with certain embodiments, FIG. 1 includes side views of members in three different orientations with displacing structures having a curved displacing surface, according to embodiments. The sequence of views 100A, 100B, 100C in FIG. 1 depict the substantially parallel motion of member 102 relative to member 118. View 100A shows a pre-engagement position. View 100B depicts engagement of the displacing structures 108A, 108B, resulting in increased displacement 120 between member 102 and member 118. View 100C shows decreased displacement 104B resulting in compression of the compressible seal 106 (view 100C). The parallel motion of member 102 ends once compressible seal 106 is compressed. Various forms of compressible seal 106 can be designed to be compressed in response to a force normal to the surface of member 102 and/or 118.

Sequences shown by other figures depict similar parallel motion, possible increased displacement during substantially parallel motion, and subsequent decreased displacement resulting in compression of the compressible seal.

Figure 2:
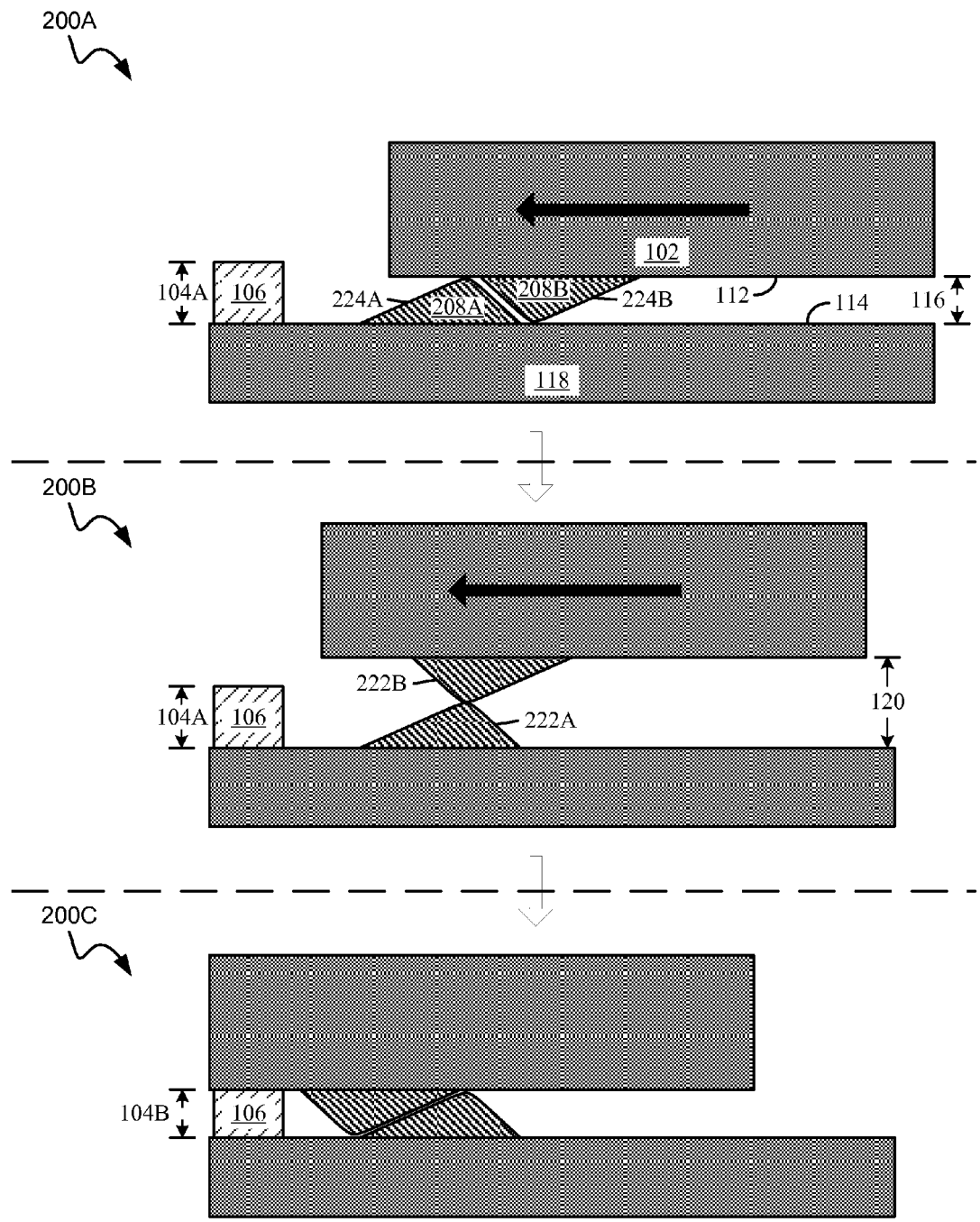
FIG. 2 includes side views of members in three different orientations with displacing structures having a plurality of sloped surfaces, according to embodiments.
Figure 3:
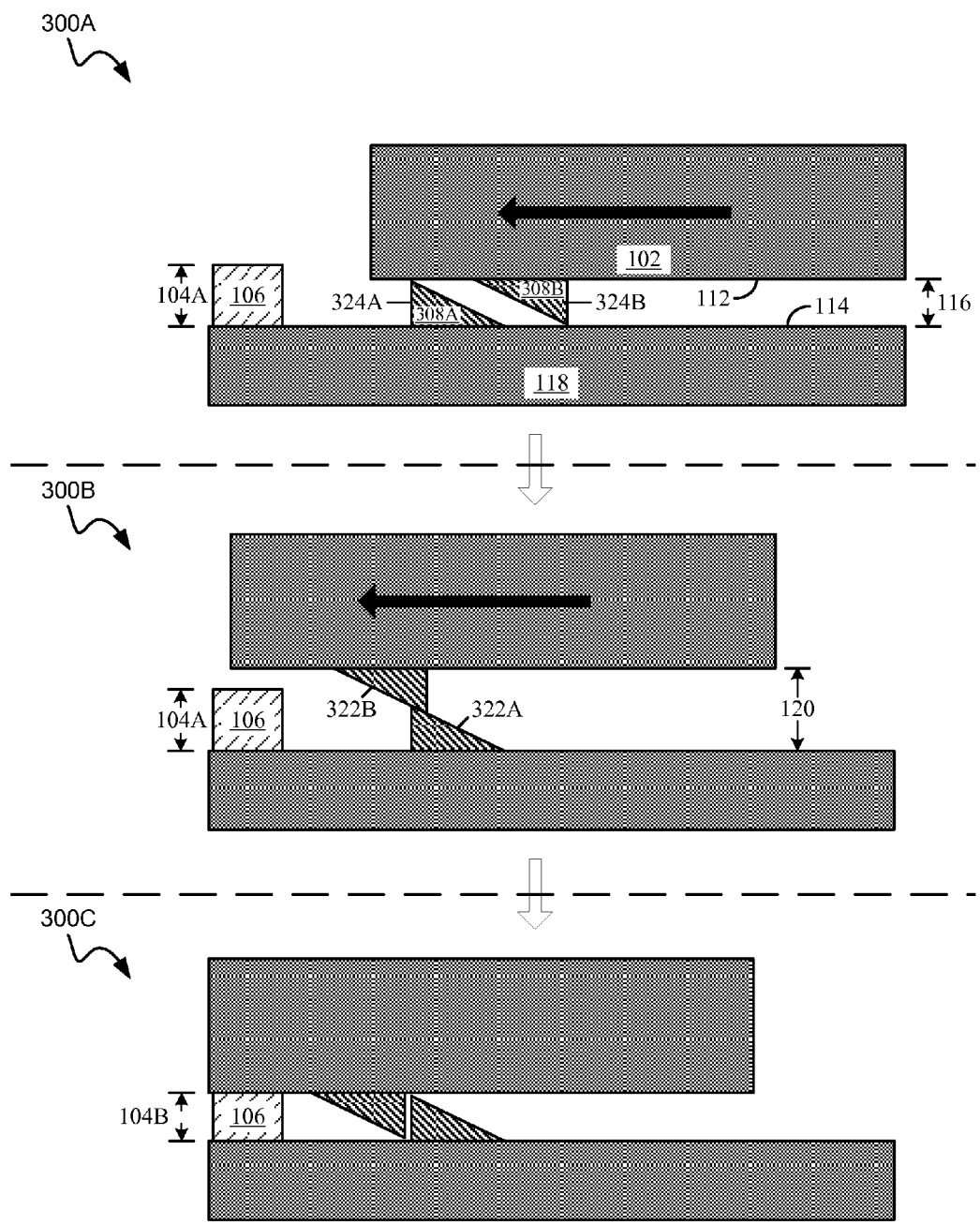
FIG. 3 includes side views of members in three different orientations with displacing structures having at least one linear sloped surface, according to embodiments.

FIGS. 1, 2 and 3 each depict two members 102, 118, with facing planar surfaces 112, 114, each surface having an attached displacing structure. Each displacing structure has both a displacing surface and a latching surface. The compressible seal 106 is attached to the lower member 118.

The displacing surfaces in FIGS. 1, 2 and 3 are configured and arranged to create an increased displacement 120 relative to the initial displacement 116 between the two facing planar surfaces 112, 114 in conjunction with the relative parallel motion of the members 102, 118. The increased displacement 120 allows the upper planar surface 112 to slide past the compressible seal 106 with minimal or no contact before displacement is reduced, compressing compressible seal 106. The absence of contact (see FIG. 1, 3) or the minimized contact (see FIG. 2) before compression of the compressible seal 106 may respectively reduce or eliminate the sheer force on the compressible seal 106 from the planar surface 112. Reduction or elimination of the sheer force on compressible seal 106 may reduce or eliminate displacement, detachment, or sheering of compressible seal 106.

FIGS. 1, 2 and 3 depict embodiments with three different types of displacing structures, but other types of displacing structures are contemplated. Generally, pairs of displacing structures are depicted as similar, except for position and orientation, however, any suitable combination of displacing structure shapes may be employed, providing their displacing and latching surfaces interact to provide appropriate displacement and latching effects. For simplicity of illustration, FIGS. 1, 2 and 3 all depict an initial displacement 116, however a range of initial displacements may be suitable.

Figure 4:
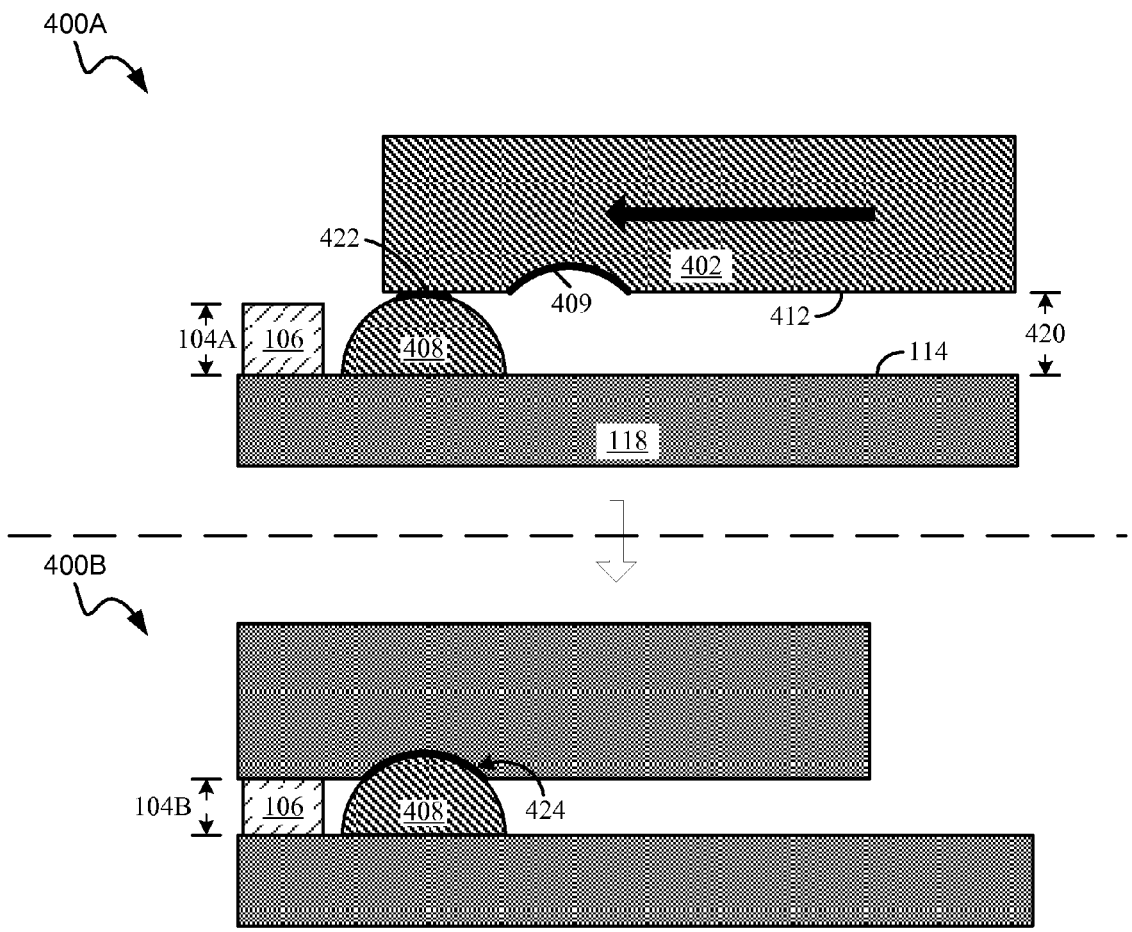
FIG. 4 includes side views of members in two different orientations with displacing structures having a surface in the shape of an arc and a receptacle to receive the arc, according to embodiments.

FIG. 4 depicts two members 402, 118, with facing planar surfaces 412, 114, and displacing structure 408 attached to planar surface 114. Displacing structure 408 has both a displacing surface 422 and a latching surface 424. The compressible seal 106 is attached to the lower member 118.

Figure 5:
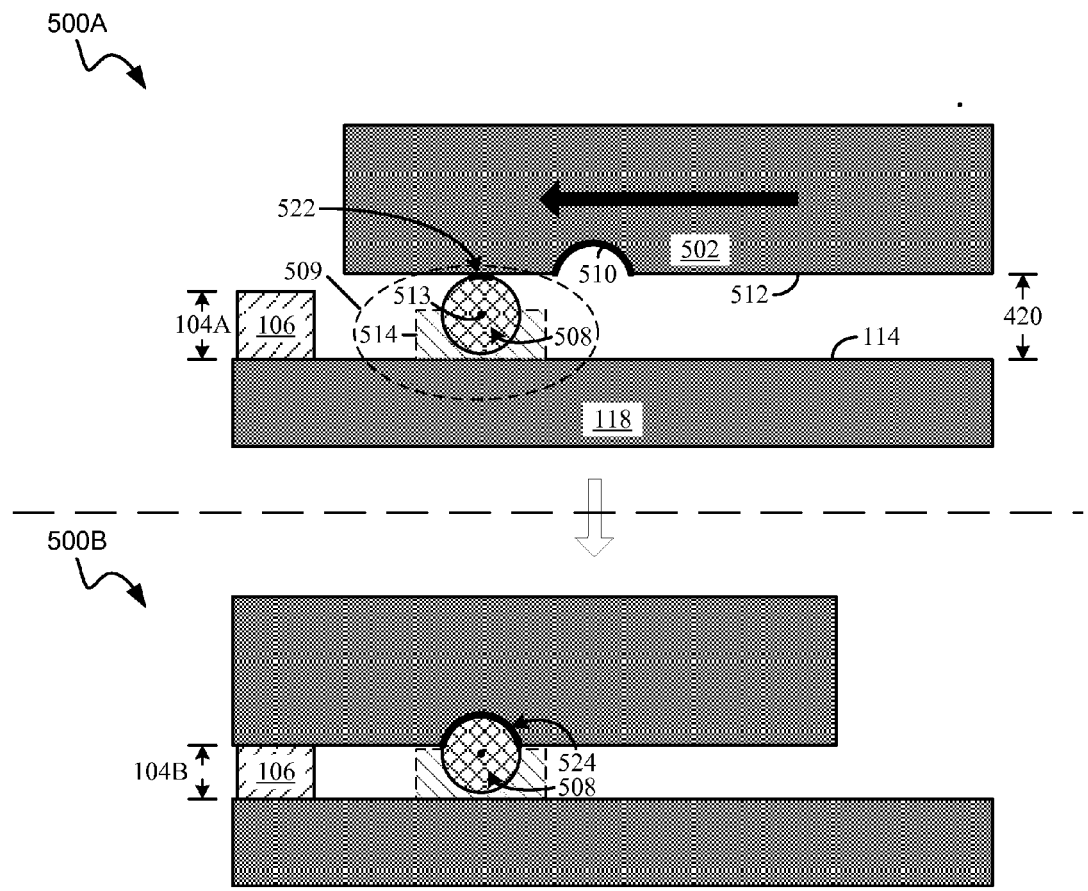
FIG. 5 includes side views of members in two different orientations with displacing structures comprising a roller and a receptacle to receive the roller, according to embodiments.

Displacing surface 422 is designed to maintain a displacement (FIG. 4A, 420) between the two facing planar surfaces 412, 114 during parallel motion of the members 402, 118 with respect to each other. The initial displacement 420 allows the upper planar surface 412 to slide past the compressible seal 106 with minimal or no contact before compressing it. The minimized contact before compression of the compressible seal 106 may reduce or eliminate the sheer force on the compressible seal 106 from the planar surface 412. FIG. 5 depicts a similar arrangement of planar surfaces and displacing structures.

FIGS. 4 and 5 depict embodiments with two different types of displacing structures, but other types of displacing structures are contemplated. Displacing structures may be attached to or integral to members provided their displacing and latching surfaces interact to provide appropriate displacement and latching effects. For simplicity of illustration, FIGS. 4 and 5 both depict initial displacement 420, however a range of initial displacements may be suitable.

Displacing structures such as those depicted in the figures may be designed and modified as needed by one of ordinary skill in the art to provide an appropriate amount of compression on the compressible seal 106.

Displacing structures may have a shape, sloped surfaces, and height that facilitate achieving and maintaining a displacement between the two parallel surfaces of the two members before compression of the compressible seal. The contour and slopes of displacing and latching surfaces of the displacing structure may be chosen to suit a particular application, for example, to provide ease of insertion and removal of members relative to each other, or a strong latching effect between two members.

For example, the displacing surface of each displacing structure may be sloped to reduce friction between two engaged displacing structures. At least one of the structures must have a slope that allows it to slide up upon the other displacing structure.

Displacing structures may also be shaped to enable decreasing the distance between the two parallel surfaces of the two members following the parallel surface motion, to compress the compressible seal between the surfaces while reducing or eliminating the sheer force applied to the compressible seal.

Some embodiments of the present disclosure (see FIGS. 1, 3 and 7) employ displacing structure shapes that may eliminate sheer forces experienced by the compressible seal to within small mechanical placement tolerances, while others (see FIGS. 2, 4 and 5) reduce sheer forces from what the compressible seal would experience without the displacement surface(s). Small amounts of motion that do not cause detachment, deformation, or sheering of the compressible seal are still within the spirit of the invention.

Displacing structures may be created from a variety of materials such as plastic, nylon, Teflon, metal or others. Displacing structure materials may be chosen based on durability, coefficient of friction, cost, or other criteria. Displacing structures may integral to members (components) (e.g., FIG. 4A 409) or they may be attached to a member (e.g., FIG. 4A 408).

Displacing structure attachment methods may include, but are not limited to adhesives or strips of adhesive, epoxy, clips, Velcro, embedded magnetic material, welds, insertable fasteners (rivets, screws, darts, and rivets), zip ties, or snaps. The attachment structure can be designed to physically secure two components together while not interfering with either the compressible seal and maintaining a space between adjacent planar surfaces of the components.

Displacing structures may take the form of individual sections placed periodically along the length of the compressible seal, or of one continuous strip that is the length of the compressible seal.

Embodiments of the displacing structures manufactured from plastic may offer the advantages of low cost of manufacture, lack of tooling costs, the flexibility to bend, and/or the ability to conform to surface irregularities. Embodiments using various rapid attachment solutions (e.g., adhesives, epoxy) may be easily employed, on the manufacturing line, in field situations, or for post-development design refinement. Embodiments also allow for irregularities in, or inconsistent placement tolerances of an existing compressible seal, and may make manufacturing less costly.

Various embodiments may make use of the latching surfaces on the displacing structures to inhibit motion of the members with respect to each other once the seal between them has been formed, thus creating a locking or retention effect between the members.

Figure 7:
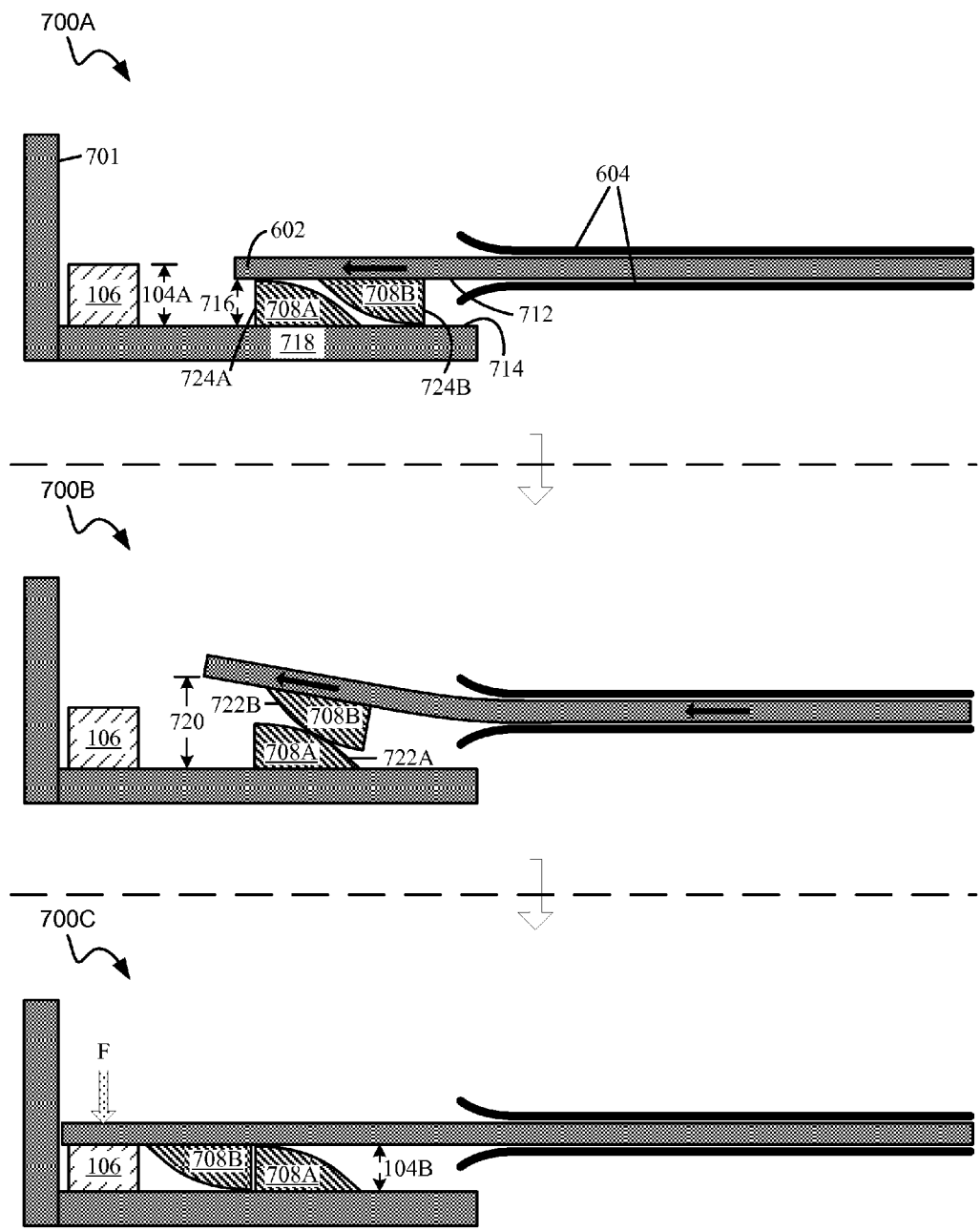
FIG. 7 includes top views of the removable panel and front panel of FIG. 6 in three different relative positions, according to embodiments.

FIG. 1 depicts two latching structures 108A, 108B with vertical latching surfaces 124A, 124B which may provide a strong latching effect (locking) between the members 102 and 118. FIGS. 3 and 7 similarly each depict two latching structures with vertical latching surfaces which may provide the strong latching effect between the members depicted.

The latching (locking) effect created by vertical latching surface pairs may require an unlatching mechanism to create a displacement between the planar members to provide vertical latching surface pairs clearance to pass by each other. For example, vertical latching surface pair 124A, 124B may require a displacement between members 102 and 118 to provide 124A, 124B enough clearance to pass by each other in the opposite direction as shown in FIG. 1. The unlatching mechanism may include a hole in member 118, into which a rod may be inserted from the lower surface of member 118 and used to exert an upward force on member 102, moving it away from member 118, providing a displacement to allow the displacing structures to pass by each other upon parallel motion of member 102.

FIG. 2 depicts two latching structures 208A, 208B with sloped latching surfaces 224A, 224B which may provide a moderate but reversible latching effect between the members 102 and 118. Similarly, FIGS. 4 and 5 also each depict two similar latching surface pairs 409, 424 and 510, 524 which also may provide a moderate but reversible latching effect between the members 402/502 and 118, respectively.

The latching depicted in FIGS. 2, 4 and 5 is expected to be overcome with a moderate force exerted on member 102, 402, 502, respectively in the opposite direction to that depicted, and thus may not require a separate mechanism to release the latched members from each other. The slope and contour of latching surfaces may be modified in order to provide a specified amount of mechanical retention force between the members.

References 108A and 108B refer to two instances of like displacing structures, differing in orientation and which member they are attached to. Reference pairs 208A, 208B (FIG. 2) and 308A, 308B (FIG. 3) and 708A, 708B (FIG. 7) refer to similar pairs of like displacing structures.

Views 100A, 100B and 100C depicted in FIG. 1 show two members 102 and 118 in three different positions relative to each other, and serve to illustrate both parallel surface and displacement motion. Similarly numbered view sets for FIGS. 2, 3, 4 5 and 7 depict similar parallel surface and displacement motion.

View sets for the figures all depict compressible seal height 104B as less than height 104A, due to compression of the compressible seal 106 between planar surfaces of the two depicted members in each figure.

Consistent with embodiments of the present disclosure, members depicted in the figures may be connected to a support structure (not shown) at right side of each illustration. This support structure can support and provide a physical spacing between the two members. This support structure may include any of the displacing structures depicted in any of the figures, or other connection structures that maintain a parallel orientation between the two planar surfaces.

FIG. 1 includes three side views (100A, 100B, 100C) of members 118, 102 in three different relative positions. Members 118, 102 have facing planar surfaces 114, 112 and attached ramp shaped displacing structures 108A, 108B, respectively. Displacing structures 108A, 108B have curved displacing surfaces 122A, 122B, respectively, and vertical latching surfaces 124A, 124B respectively, according to embodiments. Compressible seal 106 is attached to planar surface 114 of member 118.

View 100A depicts members 102 and 118 in a position with displacing structures 108A and 108B not engaged, and planar surfaces 112, 114 separated by initial displacement 116. Initial displacement 116 is not great enough to allow planar surface 112 of member 102 to pass over compressible seal 106 without exerting sheer force on compressible seal 106.

View 100B depicts members 102 and 118 in a position with displacing surfaces 122A and 122B contacting each other as the result of leftward movement of member 102 relative to member 118. The depicted engagement of displacing structures 108A and 108B results in the increased displacement 120 between members 102 and 118. The increased displacement 120, which is greater than compressible seal height 104A, allows member 102 to be positioned over compressible seal 106 without exerting any sheer force on compressible seal 106.

View 100C depicts members 102 and 118 in a position with displacing structures 108A and 108B latching the members 102 and 118 together, as the result of further leftward movement of member 102 relative to member 118. The passing of the displacing surfaces 122A and 122B past each other allows member 102 to compress the compressible seal 106, while not exerting sheer force on it.

FIG. 2 includes three side views (200A, 200B, 200C) of members 118, 102 in three different relative positions. Members 118, 102 have facing planar surfaces 114, 112 and attached ramp shaped displacing structures 208A, 208B, respectively. Displacing structures 208A, 208B have sloped displacing surfaces 222A, 222B, respectively, and sloped latching surfaces 224A, 224B respectively, according to embodiments. Compressible seal 106 is attached to planar surface 114 of member 118.

View 200A depicts members 102 and 118 in a position with displacing structures 208A and 208B not engaged, and planar surfaces 112, 114 separated by initial displacement 116. Initial displacement 116 is not great enough to allow planar surface 112 of member 102 to pass over compressible seal 106 without exerting sheer force on compressible seal 106.

View 200B depicts members 102 and 118 in a position with displacing surfaces 222A and 222B contacting each other as a result of leftward movement of member 102 relative to member 118. The depicted engagement of displacing structures 208A and 208B results in the increased displacement 120 between members 102 and 118. The increased displacement 120, which is greater than compressible seal height 104A, allows member 102 to be positioned over and move towards compressible seal 106 while exerting reduced sheer force on compressible seal 106.

View 200C depicts members 102 and 118 in a position with displacing structures 208A and 208B latching the members 102 and 118 together, as a result of further leftward movement of member 102 relative to member 118. The passing of the displacing surfaces 222A and 222B past each other allows member 102 to compress the compressible seal 106, while exerting a reduced sheer force on it.

FIG. 3 includes three side views (300A, 300B, 300C) of members 118, 102 in three different relative positions. Members 118, 102 have facing planar surfaces 114, 112 and attached ramp shaped displacing structures 308A, 308B, respectively. Displacing structures 308A, 308B have linear sloped displacing surfaces 322A, 322B, respectively, and vertical latching surfaces 324A, 324B respectively, according to embodiments. Compressible seal 106 is attached to planar surface 114 of member 118.

View 300A depicts members 102 and 118 in a position with displacing structures 308A and 308B not engaged, and planar surfaces 112, 114 separated by initial displacement 116. Initial displacement 116 is not great enough to allow planar surface 112 of member 102 to pass over compressible seal 106 without exerting sheer force on compressible seal 106.

View 300B depicts members 102 and 118 in a position with displacing surfaces 322A and 322B contacting each other as a result of leftward movement of member 102 relative to member 118. The depicted engagement of displacing structures 308A and 308B results in the increased displacement 120 between members 102 and 118. The increased displacement 120, which is greater than compressible seal height 104A, allows member 102 to be positioned over compressible seal 106 without exerting any sheer force on compressible seal 106.

View 300C depicts members 102 and 118 in a position with displacing structures 308A and 308B latching the members 102 and 118 together, as a result of further leftward movement of member 102 relative to member 118. The passing of the displacing surfaces 322A and 322B past each other allows member 102 to compress the compressible seal 106, while not exerting a sheer force on it.

FIG. 4 includes two side views (400A, 400B) of members 118, 402 in two different relative positions. Members 118, 402 have facing planar surfaces 114, 412 and member 118 has an attached arc shaped displacing structure 408. Displacing structure 408 has an arc shaped displacing surface 422, and member 402 has a planar displacing surface 412. Displacing surface 422 is defined as the contact area between the displacing structure 408 and the member 402. Displacing surface 412 is defined as the bottom planar surface of member 402.

Displacing structure 408 also has a convex arc shaped latching surface 424, while member 402 has a concave arc shaped latching surface 409 (a receptacle to receive the arc) according to embodiments. Both latching surfaces 424 and 409 are defined as the contact area between the displacing structure 408 and the member 402. Compressible seal 106 is attached to planar surface 114 of member 118.

View 400A depicts members 402 and 118 in a position with displacing structure 408 and the member 402 engaged, and planar surfaces 412, 114 separated by initial displacement 420. Initial displacement 420 is sufficient to allow planar surface 412 of member 402 to pass over compressible seal 106 without exerting sheer force on compressible seal 106.

View 400B depicts members 402 and 118 in a position with the latching surface 409 of member 402 engaged with the latching surface 424 of displacing structure 408, as a result of leftward movement of member 402 relative to member 118.

The depicted engagement of latching surfaces 409 and 424 results in the decreased displacement 104B between members 402 and 118, allowing planar surface 412 of member 402 to compress compressible seal 106 while exerting a reduced sheer force on it.

FIG. 5 includes two side views (500A, 500B) of members 118, 502 in two different relative positions. Members 118, 502 have facing planar surfaces 114, 512 and member 118 has an attached displacing structure 509. Displacing structure 509 includes roller 508 which rotates on axle 513, which is further supported by roller support 514. Roller support 514 is attached to member 118.

Roller 508 has an arc shaped displacing surface 522, and member 502 has a planar displacing surface 512. Displacing surface 522 is defined as the contact area between the roller 508 and the member 502. Displacing surface 512 is defined as the bottom planar surface of member 502.

Roller 508 also has a convex arc shaped latching surface 524, while member 502 has a concave arc shaped latching surface 510 (a receptacle to receive the roller) according to embodiments. Both latching surfaces 524 and 510 are defined as the contact area between the roller 508 and the member 502. Compressible seal 106 is attached to planar surface 114 of member 118.

View 500A depicts members 502 and 118 in a position with displacing structure 509 and the member 502 engaged, and planar surfaces 512, 114 separated by initial displacement 420. Initial displacement 420 is sufficient to allow planar surface 512 of member 502 to pass over compressible seal 106 without exerting sheer force on compressible seal 106.

View 500B depicts members 502 and 118 in a position with the latching surface 510 of member 502 engaged with the latching surface 524 of displacing structure 509, as a result of leftward movement of member 502 relative to member 118. During movement of member 502 relative to member 118, roller 508 is in contact with planar surface 512, and rotates around axle 513, maintaining initial displacement 420 between planar surfaces 512 and 114.

The depicted engagement of latching surfaces 510 and 524 results in the decreased displacement 104B between members 502 and 118, allowing planar surface 512 of member 502 to compress compressible seal 106 while exerting a reduced sheer force on it. Roller support 514 is designed so as to not interfere with the placement of member 502 relative to member 118 depicted in view 500B.

Figure 6:
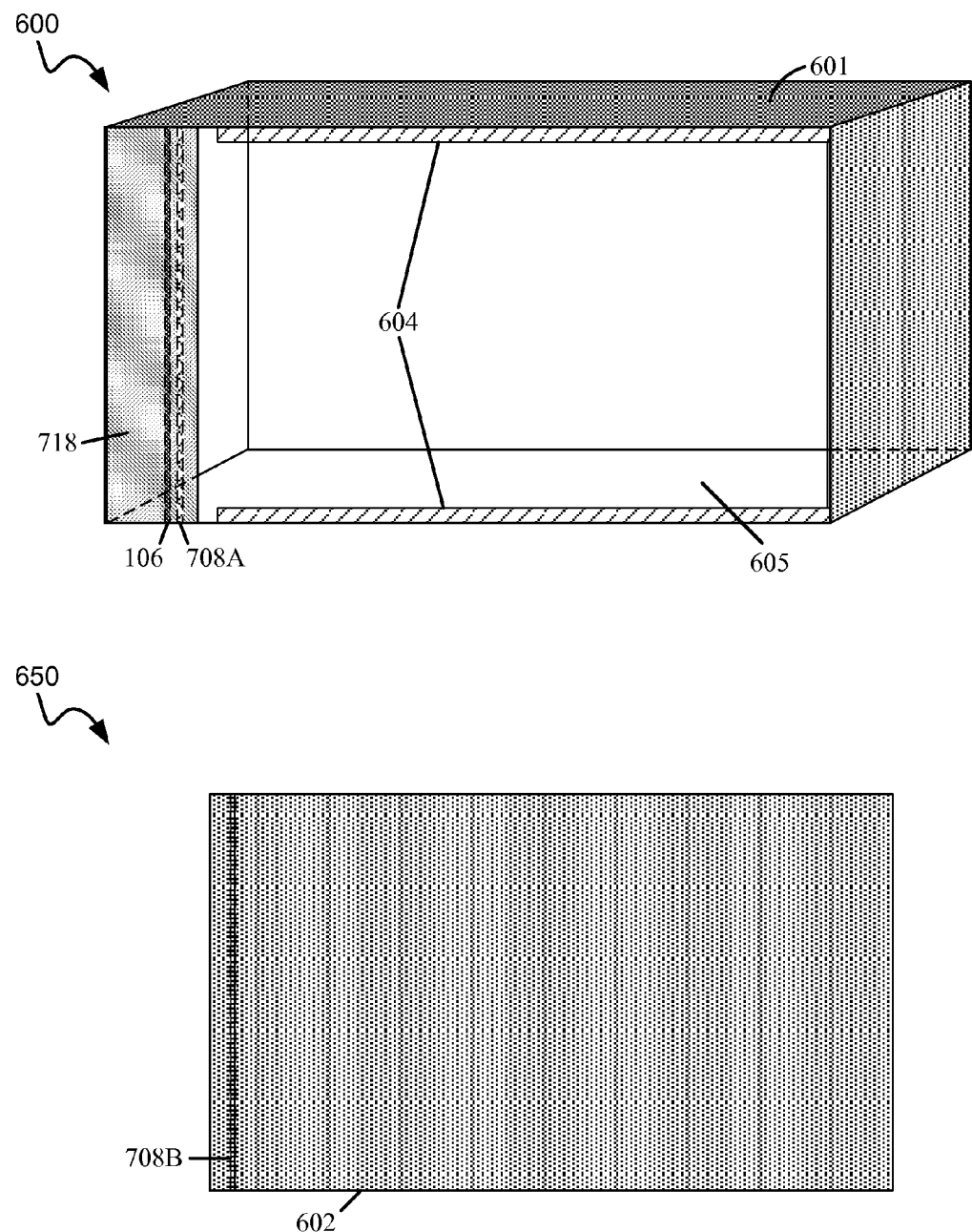
FIG. 6 includes an isometric view of a chassis, and a side view of a removable panel, according to embodiments.

FIG. 6 includes an isometric view 600 of a chassis 601, and a side view 650 of a removable panel 602, according to an embodiment. The chassis 601 may be used to contain electrical equipment. The chassis 601 includes opening 605, front panel 718 and tracks 604. Front panel 718 has the compressible seal 106 and a displacing structure 708A attached to its inner surface, which are depicted in view 650 as being viewed through the panel.

Removable panel 602 includes displacing structure 708B attached to its outer surface. Removable panel 602 is sized to cover opening 605, and to slide leftwards on tracks 604 to a closed position on the chassis 600. Tracks 604 are used to guide removable panel 602 in a direction parallel to front panel 718.

When the removable panel 602 is in a closed position on the chassis 601, compressible seal 106 is compressed between removable panel 602 and front panel 718. The structure of and interaction between removable panel 602, front panel 718, displacing structure 708A, 708B, and compressible seal 106 are further detailed in FIG. 7.

FIG. 7 includes three top views (700A, 700B, 700C) of removable panel 602 and front panel 718 in three different relative positions. Front panel 718 and removable panel 602 have facing planar surfaces 714, 712 and attached ramp shaped displacing structures 708A, 708B, respectively. Displacing structures 708A, 708B have curved displacing surfaces 722A, 722B, respectively, and vertical latching surfaces 724A, 724B respectively, according to embodiments. Compressible seal 106 is attached to planar surface 714 of front panel 718. Track 604 is attached to chassis 601 (FIG. 6) and constrains the motion of removable panel 602 to be parallel to front panel 718. Chassis member 701 is attached to front panel 718.

View 700A depicts removable panel 602 and front panel 718 in a position with displacing structures 708A and 708B not engaged, and planar surfaces 712, 714 separated by initial displacement 716. Initial displacement 716 is not great enough to allow planar surface 712 of removable panel 602 to pass over compressible seal 106 without exerting sheer force on compressible seal 106.

View 700B depicts removable panel 602 and front panel 718 in a position with displacing surfaces 722A and 722B contacting each other as a result of leftward movement of removable panel 602 relative to front panel 718. The depicted engagement of displacing structures 708A and 708B results in the increased displacement 720 (deflection of removable panel 602) between removable panel 602 and front panel 718. The increased displacement 720, which is greater than compressible seal height 104A, allows removable panel 602 to be positioned over compressible seal 106 without exerting any sheer force on compressible seal 106.

View 700C depicts removable panel 602 and front panel 718 in a position with displacing structures 708A and 708B latching the removable panel 602 and front panel 718 together, as a result of further leftward movement of removable panel 602. The movement of the displacing surfaces 722A and 722B past each other allows removable panel 602 to compress the compressible seal 106, while not exerting a sheer force on it. 104B is the final displacement and compressed height of compressible seal 106. Chassis member 701 functions as a stop to removable panel 602, prohibiting it from traveling further than the locking engagement of 708A and 708B. Other structures or mechanisms may be used to similarly prohibit further parallel motion of members.

Compressive force "F" on compressible seal 106 results from removable panel 602 returning to its original planar shape after being displaced as depicted in view 700B.

In certain instances, the source of the compressive force that holds the two members together may include, but is not limited to, tension from mechanical positioning of the two members (at least one of which is elastic), springs, gravity, latches, cams, levers, clamps or clips, depending on the application. The compressive force applied to at least one of the members is also employed to compress the compressible seal.

Although the present invention has been described in terms of specific embodiments, it is anticipated that alterations and modifications thereof may become apparent to those skilled in the art. Therefore, it is intended that the following claims be interpreted as covering all such alterations and modifications as fall within the true spirit and scope of the invention.

What is claimed is:

1. An apparatus comprising:
   a first member with a first planar surface and a first displacing structure with a first displacing surface and a first latching surface;
   a second member with a second planar surface a second displacing structure with a second displacing surface and a second latching surface;
   a compressible seal affixed to the second planar surface;
   wherein the first and second displacing structures are adapted so that contact between the first and second displacing surfaces during a parallel movement of the first planar surface relative to the second planar surface creates a separation between the first and second planar surfaces greater than a height of the compressible seal, and so that positioning of the first and second displacing surfaces past each other during parallel movement of the first planar surface relative to the second planar surface initiates the compression of the compressible seal between the first and second planar surfaces.

2. The apparatus of claim 1, wherein the first member is a removable panel adapted to fit into a side of the second member and wherein the second member is an equipment chassis that includes a plurality of tracks configured to align the panel to fit onto the chassis and to orient the first and second planar surfaces for parallel movement of the first planar surface of the panel relative to the second planar surface of the chassis; and
   tensioning springs configured to provide a compressive force to draw the planar surface of the panel against the planar surface of the chassis.

3. The apparatus of claim 1, wherein the apparatus is configured such that for the movement of the first and second displacing surfaces past each other during parallel movement of the first planar surface relative to the second planar surface, the latching surfaces of the first and the second displacing structures inhibit further parallel motion of the first planar surface relative to the second planar surface.

4. The apparatus of claim 1, wherein at least one of the first and the second displacing structures comprises a ramp shape that enables sliding of the first displacing structure over the second displacing structure.

5. The apparatus of claim 4, wherein the ramp shape comprises at least one curved surface.

6. The apparatus of claim 1, wherein the compressible seal is adapted to attenuate electromagnetic interference (EMI).

7. The apparatus of claim 1, wherein the compressible seal is adapted to direct airflow.

8. The apparatus of claim 1, wherein the compressible seal is adapted to contain a fluid.

9. The apparatus of claim 8, wherein the compressible seal is adapted to direct the flow of the fluid.

* * * * *